United States Patent
Skwarlo

(10) Patent No.: US 8,633,661 B2
(45) Date of Patent: Jan. 21, 2014

(54) TIME-DELAYED POWER SWITCHING DEVICE AND METHODS OF USE

(76) Inventor: Gary Skwarlo, Deerfield Beach, FL (US)

( * ) Notice: Subject to any disclaimer, the term of this patent is extended or adjusted under 35 U.S.C. 154(b) by 986 days.

(21) Appl. No.: 12/503,689

(22) Filed: Jul. 15, 2009

(65) Prior Publication Data

US 2011/0012539 A1   Jan. 20, 2011

(51) Int. Cl.
*H05B 41/36* (2006.01)
(52) U.S. Cl.
USPC ............ 315/360; 315/313; 315/316; 315/295
(58) Field of Classification Search
USPC ......... 315/149, 224, 291, 307, 112, 113, 118, 315/150, 308; 362/249.02, 458, 800
See application file for complete search history.

(56) References Cited

U.S. PATENT DOCUMENTS

| | | | |
|---|---|---|---|
| 3,790,848 A | 2/1974 | Lai | |
| 3,831,059 A | 8/1974 | Lo Nigro | |
| 3,934,156 A | 1/1976 | Galemmo et al. | |
| 4,027,221 A | 5/1977 | Newell | |
| 4,095,100 A | 6/1978 | Selick | |
| 4,209,728 A | 6/1980 | Membreno | |
| 4,256,993 A | 3/1981 | Morton | |
| 4,292,570 A | 9/1981 | Engel | |
| 4,368,408 A | 1/1983 | Marcus | |
| 4,449,074 A | 5/1984 | Luchaco | |
| 4,593,234 A | 6/1986 | Yang | |
| 4,731,551 A | 3/1988 | Gibbs | |
| 4,766,331 A | 8/1988 | Flegel | |
| 4,841,164 A | 6/1989 | Basso | |
| 4,991,054 A | 2/1991 | Walters | |
| 4,994,718 A | 2/1991 | Gordin | |
| 5,260,860 A * | 11/1993 | Jordan et al. | 362/431 |
| 5,327,048 A | 7/1994 | Troy | |
| 5,404,080 A | 4/1995 | Quazi | |
| 5,623,186 A | 4/1997 | Archdekin | |
| 5,808,294 A | 9/1998 | Neumann | |
| 5,895,986 A | 4/1999 | Walters | |
| 5,918,970 A * | 7/1999 | Brohard et al. | 362/370 |
| 6,031,335 A | 2/2000 | Lawrence | |
| 6,094,016 A | 7/2000 | Luger | |
| 6,119,076 A | 9/2000 | Williams et al. | |
| 6,191,568 B1 | 2/2001 | Poletti | |
| 6,316,923 B1 | 11/2001 | Poletti | |
| 6,570,342 B2 | 5/2003 | Okubo et al. | |
| 6,580,230 B2 | 6/2003 | Koncz et al. | |
| 6,583,574 B2 | 6/2003 | Ann et al. | |
| 6,657,404 B1 * | 12/2003 | Clark et al. | 315/294 |
| 6,906,476 B1 | 6/2005 | Beatenbough et al. | |

(Continued)

*Primary Examiner* — Shawki Ismail
*Assistant Examiner* — Christopher Lo

(57) ABSTRACT

A time-delayed power switching device for providing power pass-through and timed off conductive pathways to one or more light outputs comprises a power source input, one or more first conductive pathways, one or more second conductive pathways, at least one timing circuit, and at least one relay. The time-delayed power switching device controls power from a power source electrically coupled though the power source input to the timed off conductive pathways by operation of the at least one timing circuit controlling the at least one relay. The relay has a first position adapted to energize the second conductive pathways when receiving a first signal from the timing circuit, and a second position adapted to de-energize the second conductive pathways when receiving a second signal from the timing circuit. Additionally, methods of using one or more time-delayed power switching devices to retrofit lighting areas are disclosed.

2 Claims, 10 Drawing Sheets

(56) References Cited

U.S. PATENT DOCUMENTS

| | | |
|---|---|---|
| 7,084,587 B2 | 8/2006 | Archdekin et al. |
| 7,271,543 B1 | 9/2007 | Goldstein |
| 7,427,840 B2 * | 9/2008 | Morgan et al. ................ 315/295 |
| 7,443,102 B2 | 10/2008 | Yin et al. |
| 2002/0101192 A1 | 8/2002 | Ann et al. |
| 2006/0091822 A1 | 5/2006 | Bierman et al. |
| 2006/0273741 A1 * | 12/2006 | Stalker ........................... 315/291 |
| 2007/0296350 A1 * | 12/2007 | Maxik et al. .................. 315/291 |
| 2010/0320902 A1 * | 12/2010 | Yu ................................... 315/32 |

* cited by examiner

TIME-DELAYED POWER SWITCHING DEVICE AND METHODS OF USE

FIELD OF THE INVENTION

The claimed invention relates generally to devices for controlling power delivery to electrically powered devices.

BACKGROUND

A significant amount of power is consumed when lighting large areas such as parking lots, garages, and similar areas or structures. It is often desirable to reduce unnecessary power consumption to these areas when these areas are marginally used or not in use at all. However, owners of parking lots and garages are faced with several problems when attempting to reduce the significant power consumption of lighting these areas and the associated costs thereof.

Generally, lighting a large parking lot, for instance, comprises providing power to a plurality of lighting poles, each lighting pole having numerous powerful lights contained in lighting fixtures secured near the top of the lighting pole. Shutting off power to the lighting poles altogether after normal business hours use may be an option to reduce power, however, creates certain challenges. Although sparsely used during the late evening and midnight hours, parking lots and garages and the buildings they support are utilized by persons such as cleaning personnel, employees working late, etc. Moreover, laws and regulations in certain jurisdictions require specific foot candles of light to be evenly distributed on any parking lot or similar structure or area. Hence, owners may be liable for property damage or injury to persons rightfully on the property (even trespassers in certain situations) occurring under lighting conditions below standards.

Often, power to an entire parking lot or garage is turned on or off with a time clock mechanism utilizing a mechanical motor and contacts at the main power distribution feed. Power is supplied to all lights in the parking lot throughout the evening until morning, and then power is shut off to all lights at a specific time in the morning. In some situations, a photocell switching device is used at the main power distribution feed to turn power on to all lights in the parking lot at dusk and to turn power off to all lights at dawn. While proving more than sufficient lighting throughout the evening until morning, the use of a time clock mechanism or a photocell switching device does not allow for energy saving during the late evening and early morning hours of limited to no use in the associated parking lot or garage.

Complex power management schemes may be employed to some efficacy in reducing power. However, complex power management schemes typically require one or more costly and complicated power control systems to actively manage and significant retrofitting of the power distribution means including but not limited to tearing up asphalt and running new conduit and power/control cable throughout the parking lot.

Heretofore, a cost-effective and simple solution to reduce power consumption in parking lot, garages, and similar areas or structures remains elusive. In particular, it would be desirable to achieve substantial cost savings through reduced power consumption of lighting systems while maintaining a safely lit area during off peak usage of parking lots and garages with minimal capital, labor, and maintenance costs. Consequently, improved power management devices and techniques that are both simple and cost-effective requiring little to no continued maintenance activity are sought by owners and property managers of parking lots and garages.

DETAILED DESCRIPTION

Figure 1A:
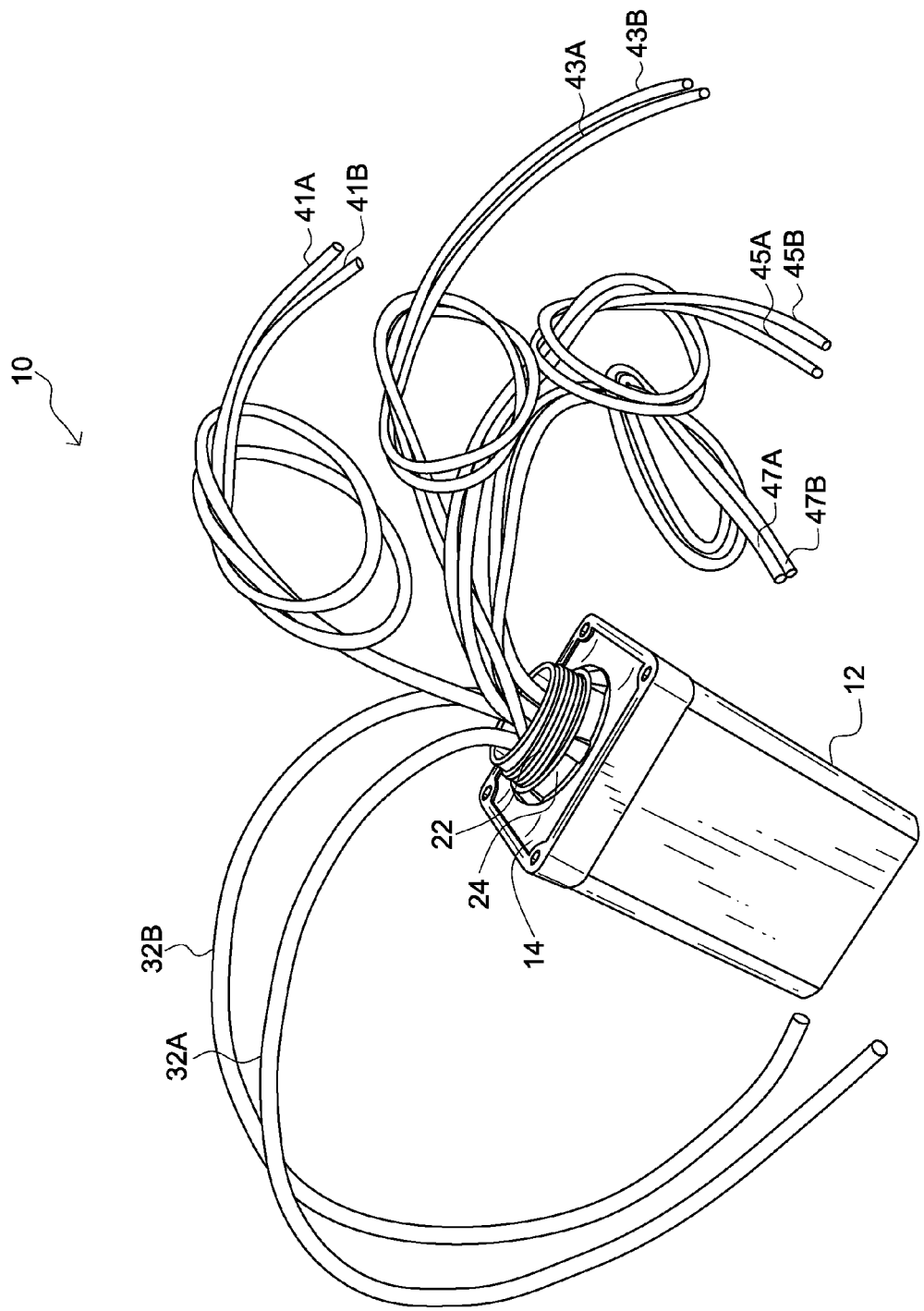
FIG. 1A is a perspective view of a time-delayed power switching device according to an embodiment.

Embodiments of the present invention relate to time-delayed power switching devices. A time-delayed power switching device typically comprises a housing, potting material, a threaded tubular sleeve, a retaining nut, a power source input, one or more first conductive pathways (power pass-through conductive pathways), and one or more second conductive pathways (timed off conductive pathways). Embodiments of time-delayed power switching devices are installed into parking lot lighting poles and similar apparatuses. When embodiments are installed into parking lot lighting poles, they may be installed in a variety of locations such as, but not limited to, junction boxes, access panels, tenon arms, light fixtures. The threaded tubular sleeve provides an opening and access for a plurality of conductive pathways as well as a way to secure to the time-delayed power switching device to various places such as a shaft of a lighting pole or a tenon assembly. Each of the parking lot lighting poles typically has a one or more light fixtures and light outputs. Power leads from a power source that typically are wired directly into each of the one or more light fixtures and light outputs is electrically coupled to the power source input of the time-delayed power switching device. A connection is made from either the first conductive pathways (providing power pass-through functionality) or the second conductive pathways (providing timed off functionality) to each of the one or more light fixtures and light outputs.

Embodiments comprise at least one timing circuit having a timer that can be started and reset at various times. The at least one timing circuit control at least one relay, which is operatively coupled to the one or more second conductive pathways (timed off conductive pathways). The timer of the timing circuit after running for a preset time period (typically, but not necessarily, set for six hours) without interruption will de-energize the second conductive pathways (timed off conductive pathways). However, the one or more first conductive pathways (power pass-through conductive pathways) remain energized even after the preset time period has expired.

Methods of using time-delayed power switching devices to retrofit existing parking lot lighting poles and associated hard-wired power distribution systems creates significant cost savings from reduced power consumption to parking lot operators while providing a safely lit area from the light outputs electrically coupled to the one or more first conductive pathways (power pass-through conductive pathways). Therefore, expensive rewiring and costly new power distribution systems with computer systems and databases are not required to achieve substantial energy cost savings when methods of using time-delayed power switching devices are employed. Moreover, after simple installation of the time-delayed power switching devices into a parking lot, garage, or similar area or structure, no management oversight or maintenance activity is required on the part of the owner and property manager.

Terminology

The terms and phrases as indicated in quotation marks (" ") in this section are intended to have the meaning ascribed to them in this Terminology section, applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to: "one embodiment"; "an embodiment"; "another embodiment"; "an alternative embodiment"; "one variation"; "a variation"; and similar phrases mean that a particular feature, structure, or characteristic described in connection with the embodiment or variation, is included in at least an embodiment or variation of the invention. The phrase "in one embodiment," "in one variation," or similar phrases, as used in various places in the specification, are not necessarily meant to refer to the same embodiment or the same variation.

The term "couple" or "coupled" as used in this specification and the appended claims, refers to either an indirect or direct connection between the identified elements, components or objects. Often the manner of the coupling will be related specifically to the manner in which the two coupled elements interact.

The term "potting material" as used in this specification and the appended claims, refers any of elastic polymers, resins, or adhesives that may be used to encapsulate various electronic components. Typically, potting materials provide environmental protection, heat transfer/dissipation, electrical insulation, and other specialized characteristics to the various electronic components encapsulated.

The term "light output" as used in this specification and the appended claims, refers to any apparatus adapted to receive electrical power and produce a visible wavelength of electromagnetic radiation. Typical, non-limiting examples of light outputs include High-Intensity Discharge (HID), incandescent, and florescent lamps, and LED assemblies. Further, HID lamps may comprise material such as, but not limited to, metal halide, mercury vapor, high-pressure sodium, and low-pressure sodium.

Embodiments of a Time-Delayed Power Switching Device

An embodiment of a time-delayed power switching device for energizing or de-energizing one or more light outputs power is illustrated in FIG. 1A. Time-delayed power switching device 10 comprises a housing 12, potting material 14, a threaded tubular sleeve 22, a retaining nut 24, a power source input 32a and 32b, one or more first conductive pathways 41a and 41b, and one or more second conductive pathways 43a, 43b, 45a, 45b, 47a, and 47b. The housing 12 typically is made from a polycarbonate material such as Lexan. However, other types of polycarbonates as well as other materials including, but not limited to, acrylic, polyethylene, glass, and aluminum are contemplated. Further, the housing 12 typically is generally rectangular with dimensions of two inches by two inches by three inches. The housing 12 is, of course, not limited by any particular size or shape, but the small size allows it to be installed in a variety of locations.

Figure 1C:
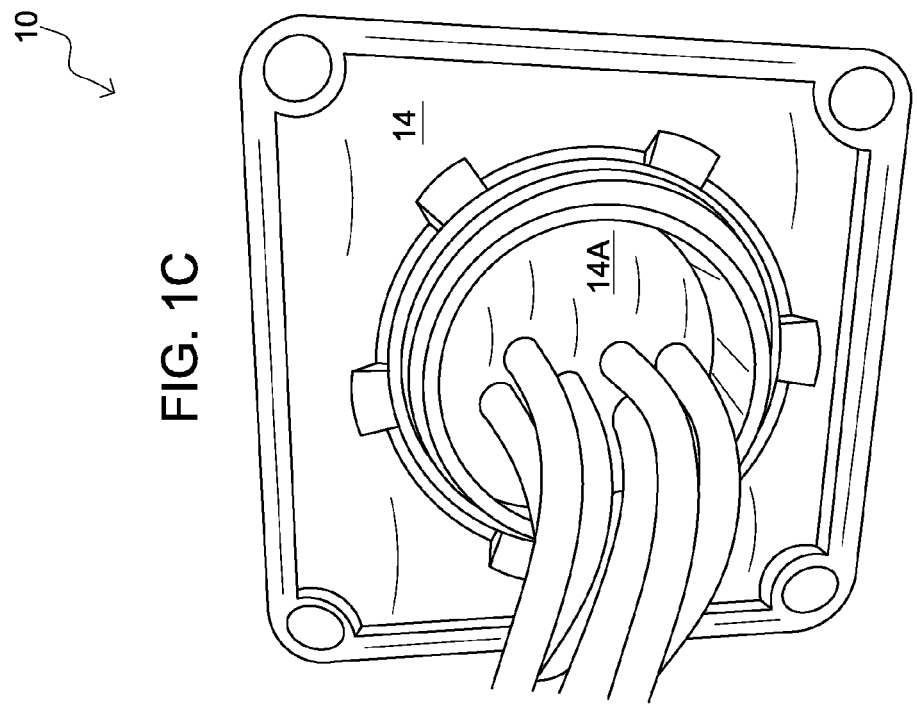
FIG. 1C is a perspective view of a time-delayed power switching device after being applied with a potting material according to an embodiment.
Figure 1B:
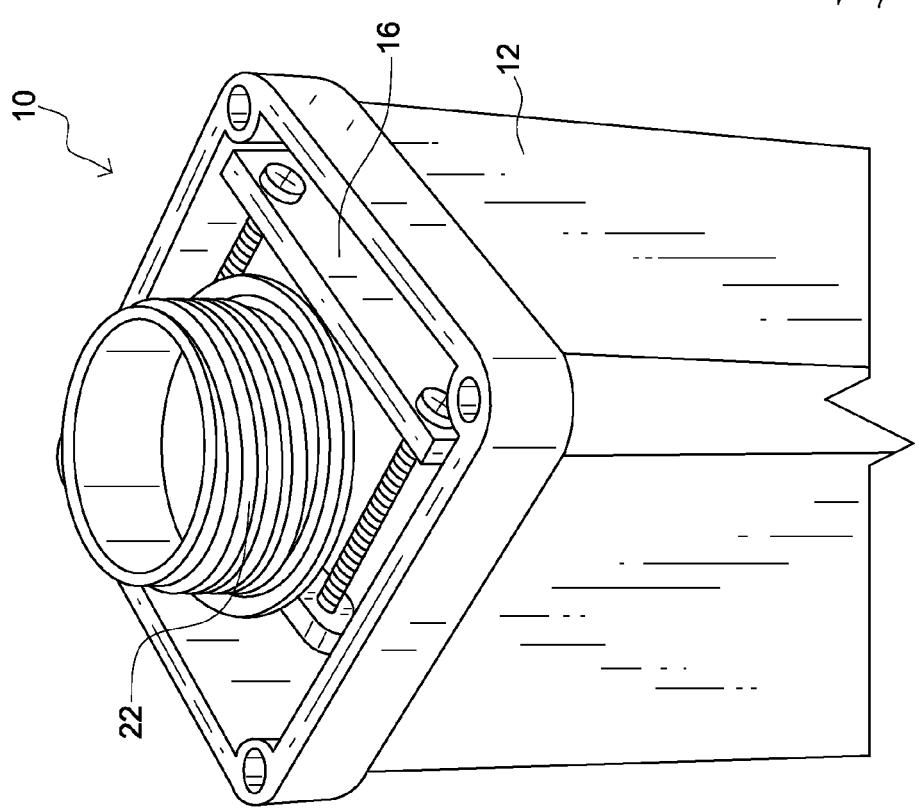
FIG. 1B is a perspective view of a time-delayed power switching device before being applied with a potting material according to an embodiment.

FIG. 1B is an illustration of the time-delayed power switching device 10 is illustrated prior to applying the potting material 14 or attaching the power source input 32a and 32b, the one or more first conductive pathways 41a and 41b, and the one or more second conductive pathways 43a, 43b, 45a, 45b, 47a, and 47b. An inner cavity of the housing 12 is shown with a circuit board 16 therein. The circuit board 16 comprises electronic component required to provide the functionality of the time-delayed power switching device 10. The power source input 32a and 32b, the one or more first conductive pathways 41a and 41b, and the one or more second conductive pathways 43a, 43b, 45a, 45b, 47a, and 47b can be attached to the circuit board 16 by soldering or other electrically conductive fastening means prior to applying the potting material 14. Wires sized ten through eighteen gage are typically used as conductive pathways, however, other wire gages and other types of conductive pathways comprising metallic and non-metallic materials allowing the flow of electric current are contemplated. Further, the circuit board 16 can be secured to the threaded tubular sleeve 22. It is pertinent to note that variations of the time-delayed power switching device 10 may not contain the threaded tubular sleeve 22, particularly when designed for internal mounting or fastening. For example, some embodiments may comprise one or more holed flanges as part of or connected to the housing whereby time-delayed power switching devices may be fastened with screws to various locations (internally or externally) on parking lot lighting poles or similar structures.

Still referring to FIG. 1B, a first portion of the threaded tubular sleeve 22 proximal the housing 12 typically extends into the inner cavity of the housing 12. As shown, the first portion of the threaded tubular sleeve 22 can be mechanically attached to the circuit board 16 with one or more brackets and screws. A second portion of the threaded tubular sleeve 22 (shown without the retaining nut 24) typically extends beyond the plane of the inner cavity oft he housing 12 thereby allowing it to be fastened to various surfaces when used with the retaining nut 24.

FIG. 1C is an illustration of the time-delayed power switching device 10 after the potting material 14 has been injected into the inner cavity of the housing 12. The plurality of electric conductors associated with the power source input 32a and 32b, the one or more first conductive pathways 41a and 41b, and the one or more second conductive pathways 43a, 43b, 45a, 45b, 47a, and 47b (not specifically labeled in FIG. 1C) is shown emanating from an opening of the threaded tubular sleeve 22. When injected into the inner cavity of the housing 12, the potting material 14 typically hardens once cured thereby providing a non-corrosive, heat-dissipating electrical insulation for the electronic components. Additionally, the potting material 14 provides shock and vibration resistant properties to the circuit board 16 and the electronic components thereon. Moreover, the potting material 14 also can serve an adhesive function securing the circuit board 16 and the threaded tubular sleeve 22 to the housing 12. Importantly, to seal and prevent corrosion of the electronic components of the circuit board 16, a portion of the potting material 14a substantially fills the opening in the first portion of the threaded tubular sleeve 22. Furthermore, an epoxy resin is typically used for the potting material 14. However, the use of other resins and materials such as, but not limited to, polyurethane and silicone is contemplated.

Typically, the entire inner cavity of the housing 12 is filled with the potting material, which substantially surrounds the items and electrical components therein. In some variations, however, only certain portions of the time-delayed power switching device 10 are covered with the potting material 14 such as, but not limited to, a surface of the circuit board 16 and electronic components thereon. Other embodiments may not include any potting material at all utilizing other means to protect against overheating, corrosion, and/or vibration of the various components.

Figure 2:
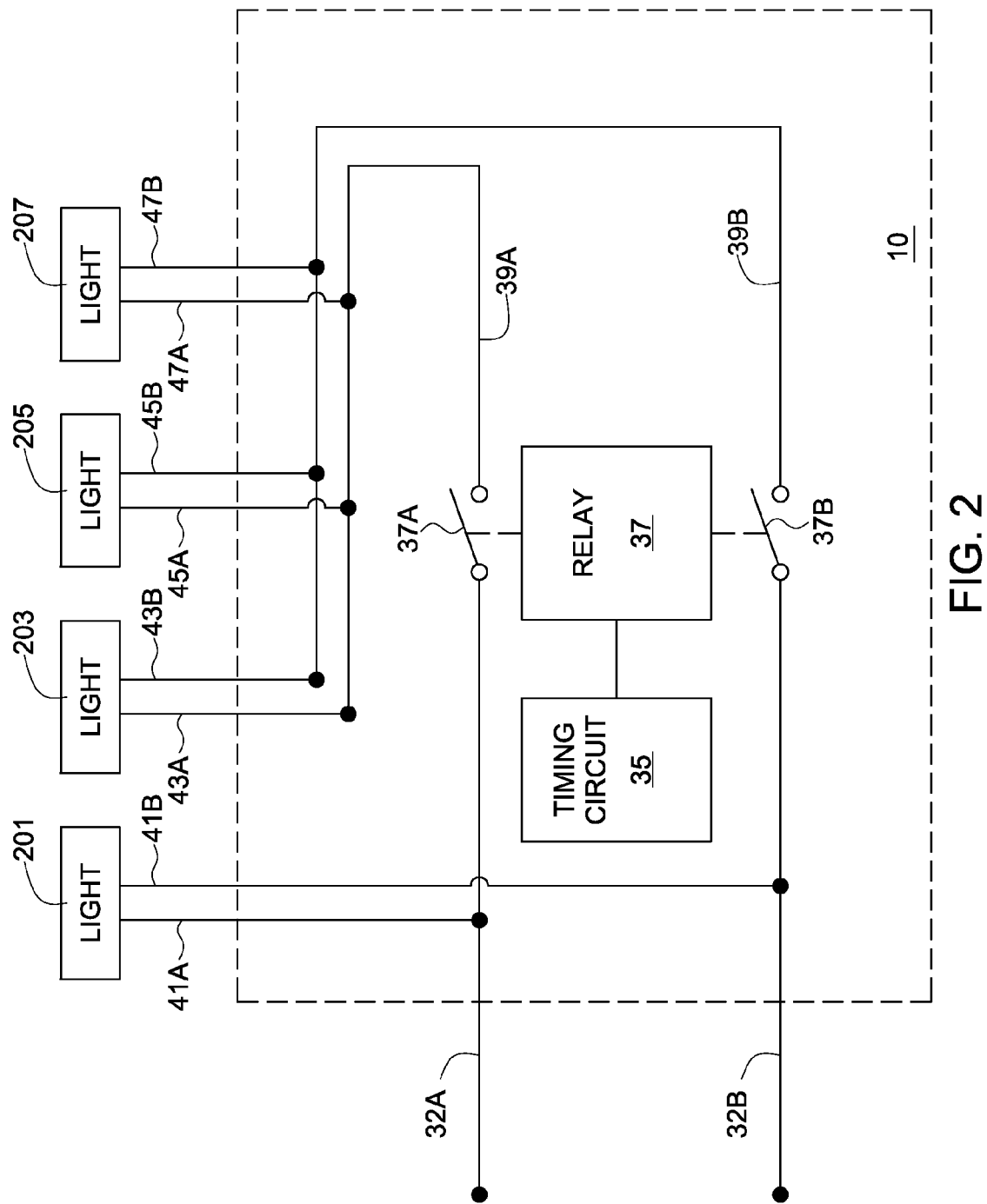
FIG. 2 illustrates a block diagram of an electric system of a time-delayed power switching device according to an embodiment.

FIG. 2 is a block diagram of an electric system of the time-delayed power switching device 10 according to an embodiment. A timing circuit 35 is operatively coupled to and controls the operation of a relay 37. Both the timing circuit 35 and the relay 37 are typically mounted on the circuit board (FIG. 1B) independently or in combination in an integrated chip along with electrical connectors and various components, particularly power conditioning components, required for their operation. Moreover, power for the operation of the electronic components, mainly the timing circuit 35 and the relay 37, is obtained from the power source input 32a and 32b.

The power source input 32a and 32b of the time-delayed power switching device 10 is directly electrically coupled to the one or more first conductive pathways 41a and 41b. The one or more first conductive pathways 41a and 41b are electrically coupled to a first light output 201. In operation, a power source is connected to the power source input 32a and 32b of the time-delayed power switching device 10. Hence, whenever power is supplied by the power source, the first light output 201 will be energized. It is pertinent to note that, in some variations, the one or more first conductive pathways 41a and 41b may be connected to the power source input 32a and 32b external to the time-delayed power switching device 10 or directly to the conductors of the power source. The one or more first conductive pathways 41a and 41b essentially provide a power pass-through function of the time-delayed power switching device 10 to keep power to the first light output 201 as long as power is supplied by the power source. Additionally, in some variations, the direct connection between the power source input 32a and 32b and the one or more first conductive pathways 41a and 41b may comprise one or more passive electrical elements, such as an in-line fuse or circuit breaker.

Still referring to FIG. 2, the power source input 32a and 32b is operatively coupled to the relay 37. The relay 37 is controlled by the timing circuit 35 and adapted to energize or de-energize the one or more second conductive pathways 43a, 43b, 45a, 45b, 47a, and 47b via electrical contacts 39a and 39b. One or more second conductive pathways 43a and 43b are electrically coupled to a second light output 203; one or more second conductive pathways 45a and 45b are electrically coupled to a third light output 205; and one or more second conductive pathways 47a and 47b are electrically coupled to a fourth light output 207. Similarly, the one or more second conductive pathways 43a, 43b, 45a, 45b, 47a, and 47b may comprise one or more passive electrical elements, such as an in-line fuse or circuit breaker.

In operation, relay 37 typically includes two positions: a first position whereby relay contacts 37a and 37b are connected to (or in contact with) electrical contacts 39a and 39b, respectively; and a second position whereby relay contacts 37a and 37b are disconnected to (or not in contact with) electrical contacts 39a and 39b, respectively. Hence, when power is supplied by the power source and the relay is operating in the first position, the second light output 203, the third light output 205, and the fourth light output 207 will be energized. However, when power is supplied by the power source and the relay is operating in the second position, the second light output 203, the third light output 205, and the fourth light output 207 will be de-energized.

The timing circuit 35 controls the relay 37 by providing either a first signal or a second signal to the relay 37. The relay 37 operates in the first position when receiving the first signal from the timing circuit 35. Similarly, the relay 37 operates in the second position when receiving the second signal. In one embodiment, the first signal can be small voltage relative to ground applied to an input of the relay 35, whereas the second signal can be a lack of a voltage (or an extremely low voltage) applied to the input of the relay 37. However, it is pertinent to note that embodiments are not limited by any first or second signal type of the timing circuit 35, but rather the operation of the relay 37 in the first position or the second position is controlled by the timing circuit 37. Typically, the time-delayed power switching device 10 can accommodate 120 volts AC, 208 volts AC, 240 volts AC, 277 volts AC, and 480 volts AC and a current of approximately 20 amps. However, some embodiments can accommodate much larger current requirements where a large number of light outputs are controlled by a single time-delayed power switching device. Yet other embodiments may be specifically adapted to a narrower range of voltages and currents for optimization of the electronic circuitry therein.

Some variations of electric systems of the time-delayed power switching device 10 described in the block diagram of FIG. 2 include a three-phase power electrical system whereby a third power source input exists. When a three-phase power electrical system is included in the design of the time-delayed power switching device 10, a third relay contact exists for relay 37 and the one or more second conductive pathways typically connect to two of the three power conductors thereby distributing the power in a relatively even fashion throughout the light outputs. Other variations of electric systems of the time-delayed power switching device 10 include an additional switching circuit between the first and second conductive pathways and the plurality of contacts or leads to the light outputs. As would be obvious to one of skill in the art, the additional switching circuit can switch or rotate the specific light output that will receive the power pass-through functionality of the first conductive pathways as opposed to being directly wired to a specific light output as shown in FIG. 2. Such a variation is beneficial to avoid overusing and burning out a specific light output when there is no directional purpose or consideration associated with the specific light output connected to the first conductive pathways.

Figure 3:
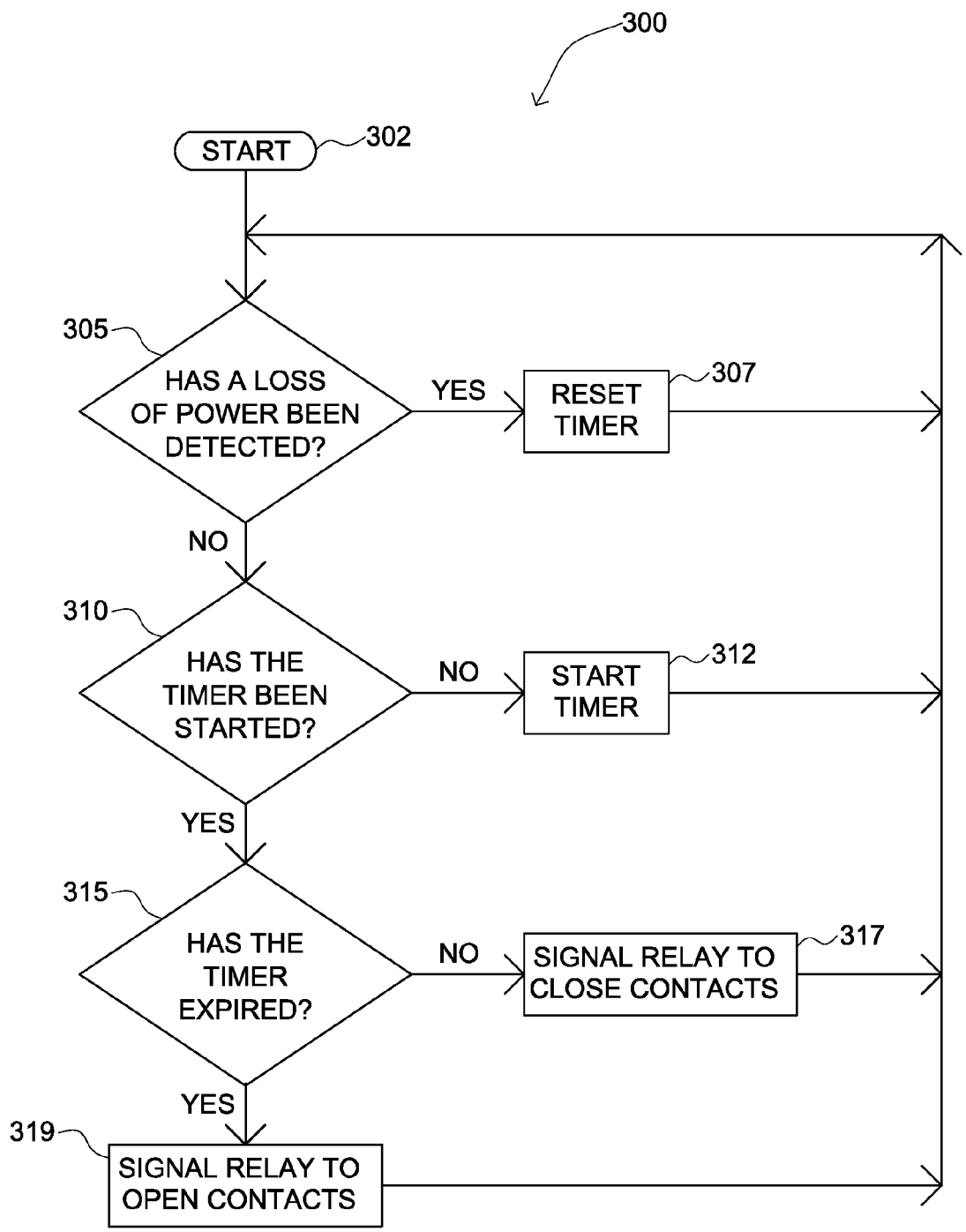
FIG. 3 illustrates a flow chart describing exemplary method of the operation of a time-delayed power switching device according to an embodiment.

Referring now to the flow chart of FIG. 3, an exemplary method of the operation of the time-delayed power switching device 10 is described. Method 300 primarily describes timing logic encoded in the timing circuit 35 used to control the operation of the relay 37. The timing circuit 35 comprises a timer that can be started and reset at various times. The timer of the timing circuit 35 runs for a preset time period. The preset time period is typically set for six hours, but can be set for any duration depending on the particular use of the time-delayed power switching device 10. Moreover, the preset time period is typically hardcoded in the timing logic encoded in the timing circuit 35. The timing circuit 35 will provide the first signal to the relay 37 after the timer has been started and during a preset time period. After the preset time period the timer expires and the timing circuit 35 will provide the first signal to the relay 37 in perpetuity until the timing circuit 35 receives a reset. The reset is typically initiated by a powering down of time-delayed power switching device 10 and timing circuit 35 therein.

A start operation 302 signifies the beginning of the method 300, typically when the timing circuit 35 is energized from power provided to it via the power source input 32a and 32b. It is pertinent to note that the power provided by the power source may be initiated by one of a number of ways including a manual switch, a time clock mechanism, a photocell switching device, a power control system, or combinations thereof Next, it is determined whether a loss of power has been detected (decision block 305). The timing circuit 35 can be adapted to detect a loss of power by setting a bit in non-volatile memory of indicating whether such an event has occurred since the last time checked by its processor. If a loss of power has been detected, an operation 307 of resetting the timer is executed. After the timer is reset when power is restored to the time-delayed power switching device 10, a loopback to decision block 305 is performed. If a loss of power has not been detected, decision block 310 is next consulted. Decision block 310 ascertains whether or not the timer has been started. If the timer has not been started, an operation 312 of starting the timer is executed. After the timer is started, a loopback to decision block 305 is performed. However, if the timer has been started, a next operation (decision block 315) is initiated.

As indicated in decision block 315, it is determined whether the timer has expired. If the timer has not expired, as will be the case during the preset time period, the timing circuit 35 will send the first signal to the relay 37 (block 317). Typically, but not necessarily, the first signal indicating to the relay 37 to energize the one or more second conductive pathways 43a, 43b, 45a, 45b, 47a, and 47b by closing contacts of the relay. After sending the first signal, a loopback to decision block 305 is performed. If the timer has expired, as will be the case after the preset time period, the timing circuit 35 will send the second signal to the relay 37 (block 319). Similarly, the relay 37 to de-energizes the one or more second conductive pathways 43a, 43b, 45a, 45b, 47a, and 47b by opening contacts of the relay 37 when receiving the second signal from the timing circuit 35. After sending the second signal, a loopback to decision block 305 is performed. As would be obvious to one of skill in the art, the first and second signals provided by the timing circuit 35 to the relay 37 may be continuous or discrete in nature depending on the type of relay utilized in embodiments.

In sum, as described with reference to FIG. 3, the timing circuit 35 operating with the relay 37 essentially provides a timed off function to the one or more second conductive pathways 43a, 43b, 45a, 45b, 47a, and 47b (referring briefly back to FIGS. 1A and 2). Moreover, the timing logic and operations described herein, particularly as described in FIG. 3, can be encoded in the timing circuit 35 by any number of ways. For example, while typically, but not necessarily performed under the control of a programmed processor, in alternative embodiments and variations, the timing logic and operations can be fully or partially implemented by any programmable or hardcoded logic, such as, but not limited to, field programmable gate arrays (FPGAs), TTL logic, and application specific integrated circuits (ASICs).

Figure 4A:
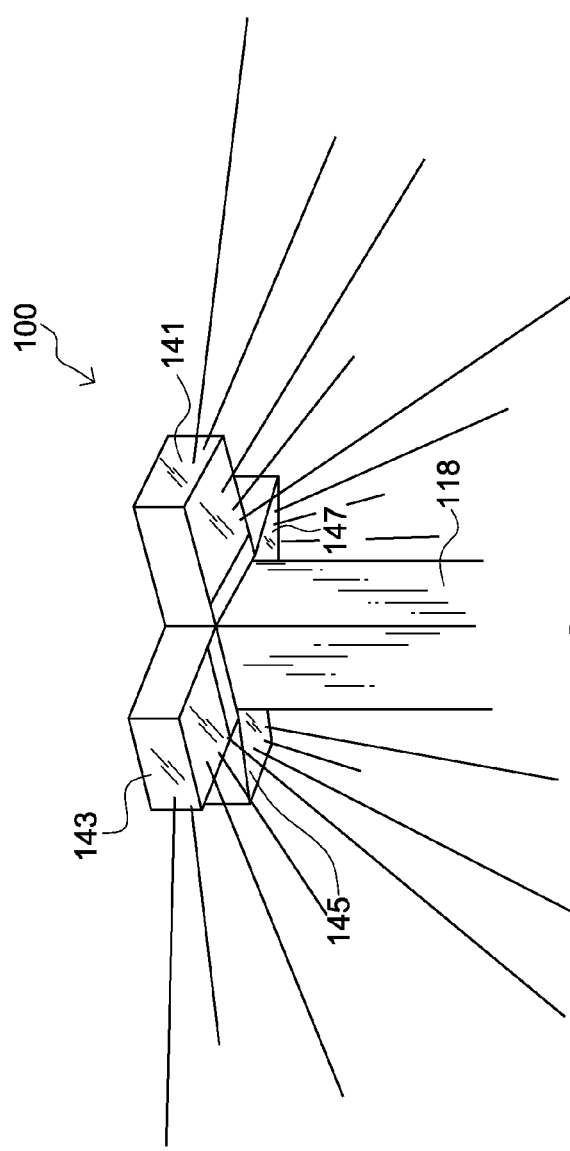
FIG. 4A is a perspective view of a top of a lighting pole with a time-delayed power switching device in a first state according to an embodiment.

FIG. 4A is a perspective view of a top of a lighting pole with the time-delayed power switching device 10 installed. The time-delayed power switching device 10 is operating in a first state whereby all oft he light outputs are energized. The lighting pole 100 has a plurality light fixtures and light outputs supported by a lighting pole shaft 118. Referring concurrently with FIG. 2, a first light fixture 141 houses the first light output 201, a second light fixture 143 houses the second light output 203, a third light fixture 145 houses the third light output 205, and a fourth light fixture 147 houses the fourth light output 207. The time-delayed power switching device 10 (not shown) is installed at the base of the lighting pole 100. However, the time-delayed power switching device 10 can be installed in a variety of locations as described later in this specification.

As illustrated in FIG. 4A each of the light outputs is energized and emitting light as the time-delayed power switching device 10 operates in the first state. In the first state, the timing circuit 35 sends the first signal to the relay 37 and the one or more second conductive pathways 43a, 43b, 45a, 45b, 47a, and 47b are energized by providing electrical connectivity from the power source to the power source input 32a and 32b through the relay contacts 37a and 37b and the electrical contacts 39a and 39b. Hence, first light output 201 (via the direct electrical coupling of the one or more first conductive pathways 41a and 41b with the power source input 32a and 32b) in the first light fixture 141, the second light output 203 in the second light fixture 143, the third light output 205 in the third light fixture 145, and the fourth light output 207 in the fourth light fixture 147 are all energized and emitting light in the first state of operation.

Figure 4B:
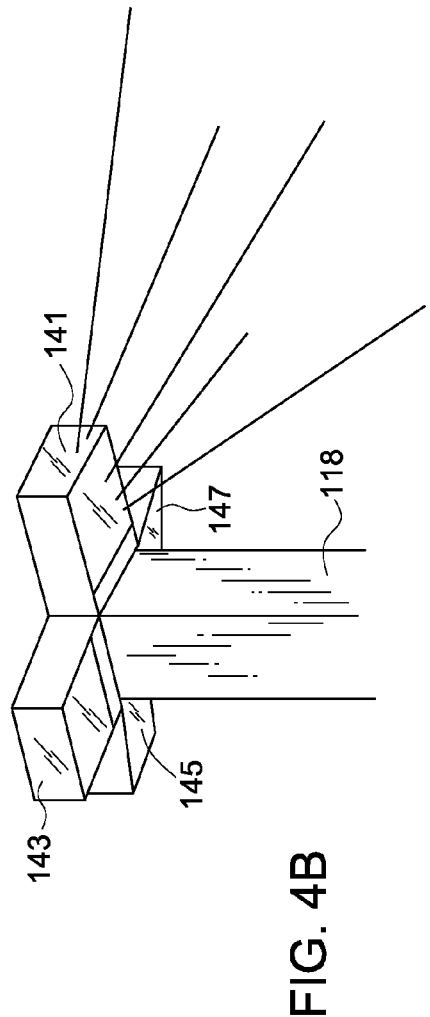
FIG. 4B is a perspective view of a top of a lighting pole with a time-delayed power switching device in a second state according to an embodiment.

Now referring to FIG. 4B, a perspective view of the top of the lighting pole 100 with the time-delayed power switching device 10 operating in a second state. The second state of operation occurs when the timing circuit 35 sends the second signal to the relay 37 and the one or more second conductive pathways 43a, 43b, 45a, 45b, 47a, and 47b are de-energized by disconnecting electrical connectivity from the power source to the power source input 32a and 32b by opening relay contacts 37a and 37b. Hence, first light output 201 in the (via the direct electrical coupling of the one or more first conductive pathways 41a and 41b with the power source input 32a and 32b) in the first light fixture 141 is still energized and emitting light, but the second light output 203 in the second light fixture 143, the third light output 205 in the third light fixture 145, and the fourth light output 207 in the fourth light fixture 147 are de-energized and not emitting light in the second state of operation.

Figure 5A:
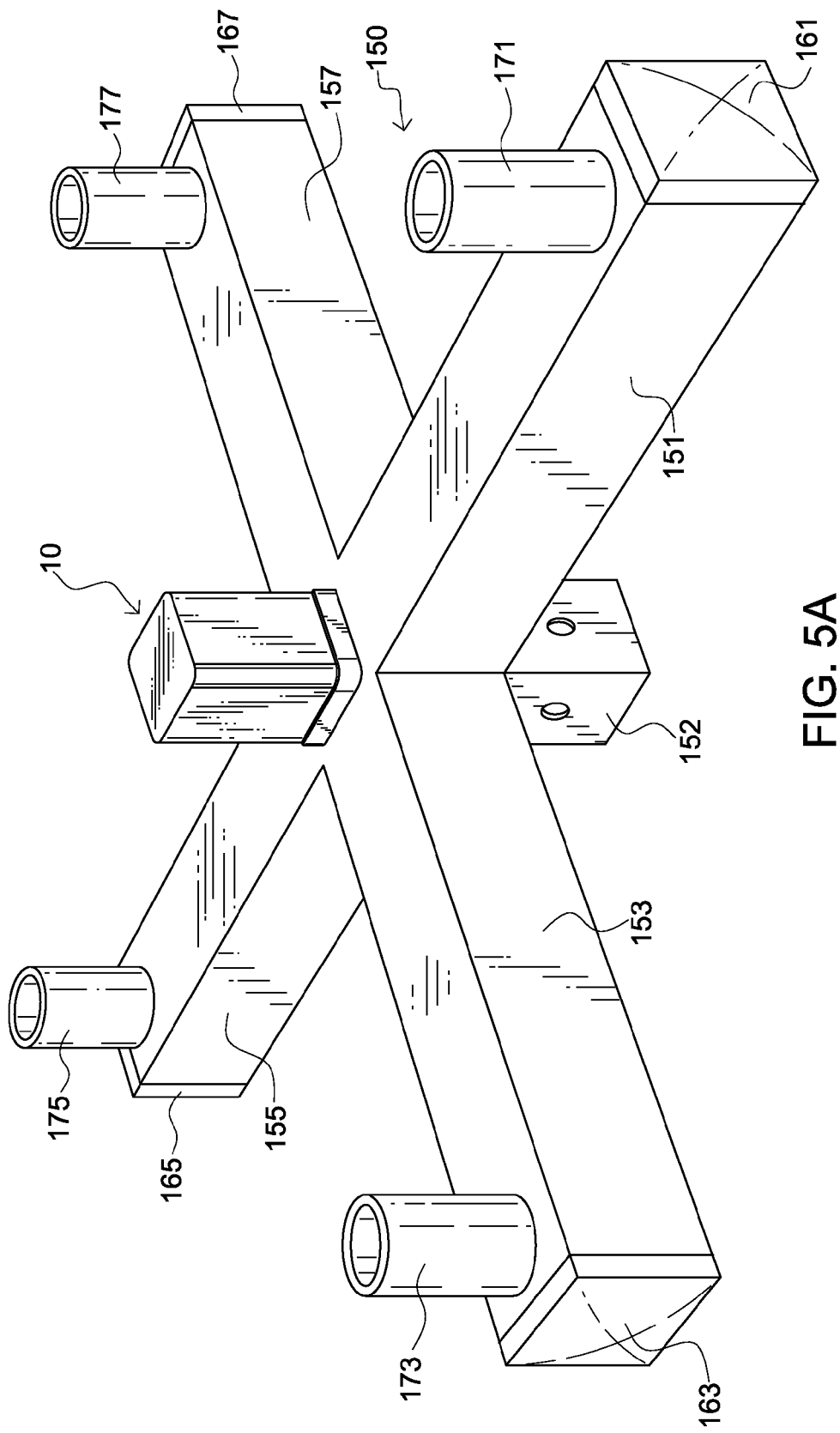
FIG. 5A is a perspective view of an exemplary tenon assembly with a time-delayed power switching device according to an embodiment.

FIG. 5A is a perspective view of an exemplary tenon assembly with the time-delayed power switching device 10 externally attached. Tenon assembly 150 includes, but is not limited to: one or more tenon arms 151, 153, 155, and 157; one or more end caps 161, 163, 165, and 167; one or more light fixture tenon adapters 171, 173, 175, and 177, and a lighting pole tenon adapter 152. It is to be appreciated that the depiction of tenon assembly 150 is not in any way limiting to shape and number of elements depicted in FIG. 5A. Any of a wide variety of tenon assemblies may be used in conjunction the time-delayed power switching device 10. For example, variations often on assemblies may include a variation having only a single tenon arm and light fixture tenon adapter. Another variation may have six tenon arms and six light fixture tenon adapters. In yet other variations, tenon assembly 150 may not include the lighting pole tenon adapter 152, but rather a mounting bracket or means to secure the tenon assembly 150 to a wall, a ceiling, or a canopy. The wall or ceiling may be that of a parking garage, and the canopy may provide a lighted area for a gas station or truck stop, for instance. Moreover, the time-delayed power switching device 10 may be mounted in any of a number of locations on the tenon assembly 150, internally or externally. For instance, in a variation of the tenon assembly 150, tenon arm 151 may be cylindrical whereby end cap 161 may be replaced with the time-delayed power switching device 10 having the threaded tubular sleeve 22 matingly coupled with a distal end of the tenon arm 151. The threaded tubular sleeve 22 of time-delayed power switching device 10 can also be placed through an aperture of the tenon assembly 150 allowing the time-delayed power switching device 10 to be attached to the tenon assembly 150 with retaining nut 24. The aperture can be an existing opening in a section on the surface of the tenon assembly 150 similar to that described above. However, the aperture can also be a hole or bore drilled into a portion of the tenon assembly 150. Additionally, where an interior area of the tenon assembly 150 is sufficiently large, the time-delayed power switching device 10 may simply be placed in an internal area of the tenon assembly 150.

Figure 5B:
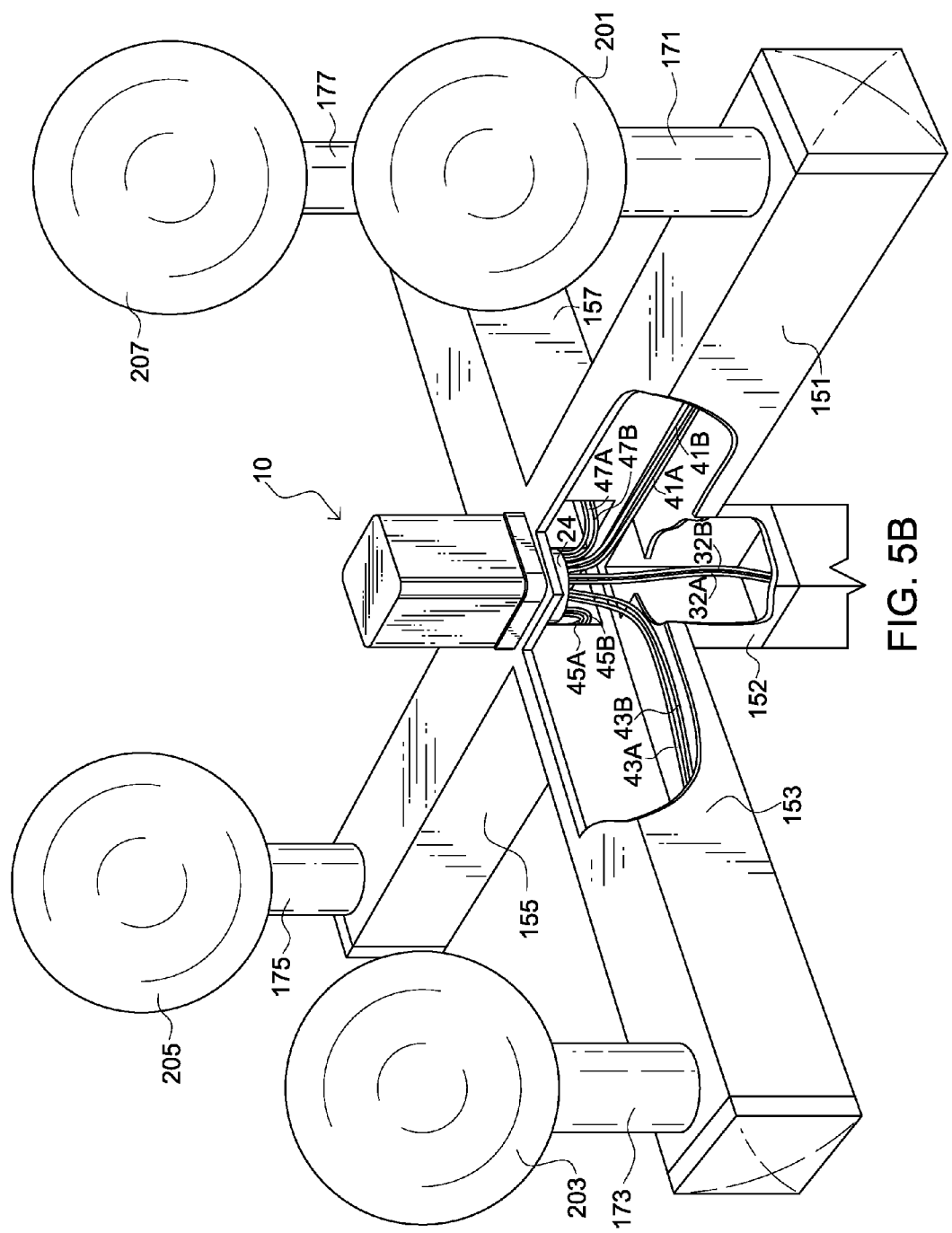
FIG. 5B is a fragmentary, exploded cross-sectional view of an exemplary tenon assembly with time-delayed power switching device according to an embodiment.

FIG. 5B is a fragmentary, exploded cross-sectional view of an exemplary tenon assembly with the time-delayed power switching device 10. The power source input 32a and 32b can be connected to the power source such as by splicing power conductive leads from the power source to the power source input 32a and 32b. Similarly, the conductive leads providing power to the first light output 201 can be connected to the one or more first conductive pathways 41a and 41b to provide power pass-through functionality to the first light output 201 so that it remains energized as long as power is supplied by the power source. To provide timed off functionality to the remaining light outputs, second conductive pathways 43a and 43b can be connected to the conductive leads providing power to the second light output 203, second conductive pathways 45a and 45b can be connected to the conductive leads providing power to the third light output 205, and second conductive pathways 47a and 47b can be connected to the conductive leads providing power to the fourth light output 207. Alternatively, the one or more first conductive pathways 41a and 41b, and the one or more second conductive pathways 43a, 43b, 45a, 45b, 47a, and 47b can be connected contacts/terminals providing power to their respective light fixtures and light outputs 201, 203, 205, and 207. Typically, conductive leads from the power source enter the tenon assembly 150 through an opening of the lighting pole tenon adapter 152 and internal space therein. Moreover, the one or more first conductive pathways 41a and 41b, the one or more second conductive pathways 43a, 43b, 45a, 45b, 47a, and 47b, and/or the conductive leads providing power to the light outputs typically run through the internal portions of the one or more tenon arms 151, 153, 155, and 157 out of the one or more light fixture tenon adapters 171, 173, 175, and 177 into their respective light fixtures and light outputs 201, 203, 205, and 207.

Also illustrated in FIG. 5B is retaining nut 24 attached to the threaded tubular sleeve 22 (not shown from the perspective, cross-sectional view). As previously discussed, there are many ways to attach the time-delayed power switching device 10 to tenon assemblies as well as lighting poles, generally. For example, a hole or bore that is a similar size or slightly larger than the threaded tubular sleeve 22, but smaller than the cross-sectional area of the housing 12 where the potting material 14 typically exists may be drilled into a portion of the tenon assembly 150. The first portion of the threaded tubular sleeve 22 may be placed through the bore or the hole whereby the housing 12 remains exterior to the tenon assembly 150 and the plurality of conductive pathways, or wires in one embodiment, are located in the internal area of the tenon assembly 150. The time-delayed power switching device 10 can be secured to the tenon assembly 150 by mating the threaded tubular sleeve 22 with retaining nut 24.

Figure 6:
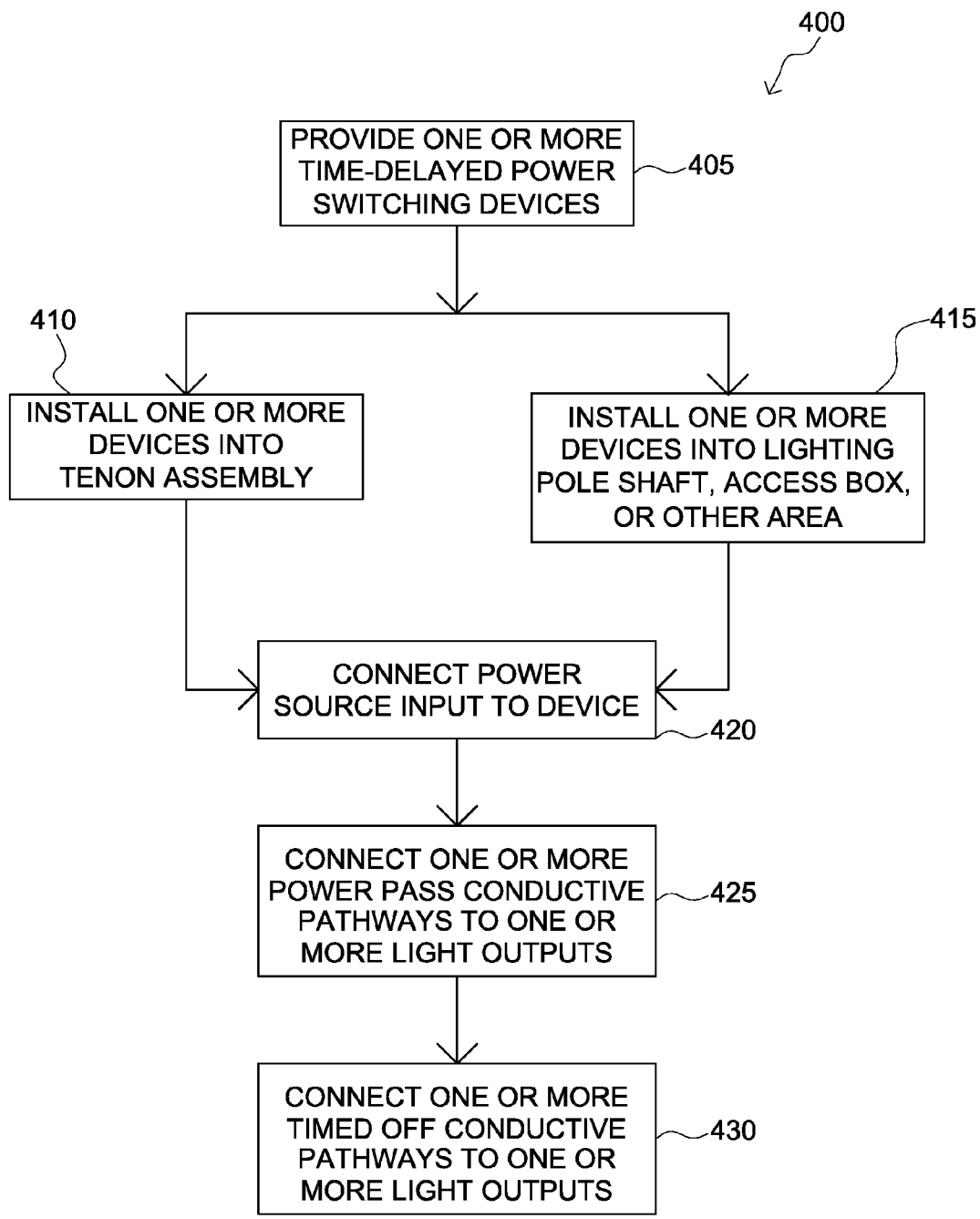
FIG. 6 illustrates a flow chart describing exemplary method of retrofitting a parking lot with one or more time-delayed power switching devices according to an embodiment.

Referring now to FIG. 6, a flow chart illustrates an exemplary method of retrofitting a parking lot or similar lighted area with one or more time-delayed power switching devices 10. Method 400 enables parking lots and similar lighted areas to be quickly and cost-effectively retrofitted allowing an owner to reduce energy costs associated with powering one or more light outputs. An operation 405 of method 400 comprises providing one or more time-delayed power switching devices 10 adapted to the specific characteristics of the retrofit being performed.

Next, an operation 410 of installing the one or more time-delayed power switching devices 10 into one or more tenon assemblies can be performed. In many situations, it may be best to install the time-delayed power switching device 10 in or onto the tenon assembly since access to wire points is typically available. However, the best location for which to access the necessary wiring may vary with each situation and lighting pole type. As such, an operation 415 of installing the one or more time-delayed power switching devices 10 on or into one or more lighting pole shafts, wiring access boxes, or other areas can also be performed. Non-limiting examples of installations include strapping the time-delayed power switching device 10 to the interior of the lighting pole shaft, drilling a hole in the lighting pole shaft and fastening the time-delayed power switching device 10 as described above with respect to the tenon assembly, and placing and fastening the time-delayed power switching device 10 into a hand hole or a wiring access panel. However, other installation involving the internal and external areas of the lighting pole or near the lighting pole and similar structures are contemplated. For example, the time-delayed power switching device 10 may be installed in the general proximity of the lighting pole such as in an underground access box serving the lighting pole.

Moreover, in any given parking lot or similar lighted area, some of the one or more time-delayed power switching devices 10 can be installed in tenon assemblies and others of the one or more time-delayed power switching devices 10 can be installed in other areas. In yet other embodiments of the method, one or more time-delayed power switching devices may be installed near one or more lighting poles with wired extensions or may be aggregated at a central wiring point.

Next, still referring to FIG. 6 but with additional reference to FIGS. 1A and 2, an operation 420 of connecting a power source of the one or more light outputs to a power source input, such as power source input 32a and 32b, of a one of the one or more time-delayed power switching devices 10 via is performed in method 400. An operation 425 of connecting one or more power pass-through conductive pathways to one or more light outputs, such as the one or more first conductive pathways 41a and 41b to light output 201, is performed. Where it is desirable to have light constantly, either pointed toward a specific area or object, such as a sidewalk or ATM for instance, or taken as a whole with respect to potentially unsafe areas, the one or more power pass-through conductive pathways may be strategically located to provide optimal lighting to the area being retrofitted. Also, an operation 430 of connecting one or more timed off conductive pathways to one or more light outputs, such as the one or more second conductive pathways 43a, 43b, 45a, 45b, 47a, and 47b to light outputs 203, 205, and 207 is performed. Typically, conductive pathways to the one or more light outputs will exist and can be used to connect to the plurality of conductive pathways to the time-delayed power switching device 10.

Operations 420, 425, and 430 can be repeated to connect the conductive pathways of each of the one or more time-delayed power switching devices 10 installed. Further, as would be obvious to one of ordinary skill in the art, the connections of the aforementioned operations providing electrical coupling between conductive pathways can be accomplished in any of a plurality of ways such as, but not limited to, connecting ends with splice caps, soldering, crimping, and/or taping. Moreover, installation and securing of each of the one or more time-delayed power switching devices 10 can occur coincidentally with the electrical coupling of the conductive pathways or may be completed in whole or in part prior to the electrical coupling. It is important to note that the conductive pathways, usually comprising a plurality of wires, typically are color-coded for ease of installation. For example, in some embodiments, each pair of wires may have its own unique color coding easily identifying its function as a connection to the power source, one or more connections to a light output designated for power pass-through operation, and one or more connections to a light output designated for timed-off operation. Moreover, once the retrofitting of the parking lot, garage, or other similar area or structure has been completed, very little or no upkeep at all is required to realize continued energy savings because each of the one or more time-delayed power switching devices 10 operates independently via its hardened electric circuitry according to the timing logic therein.

Figure 7:
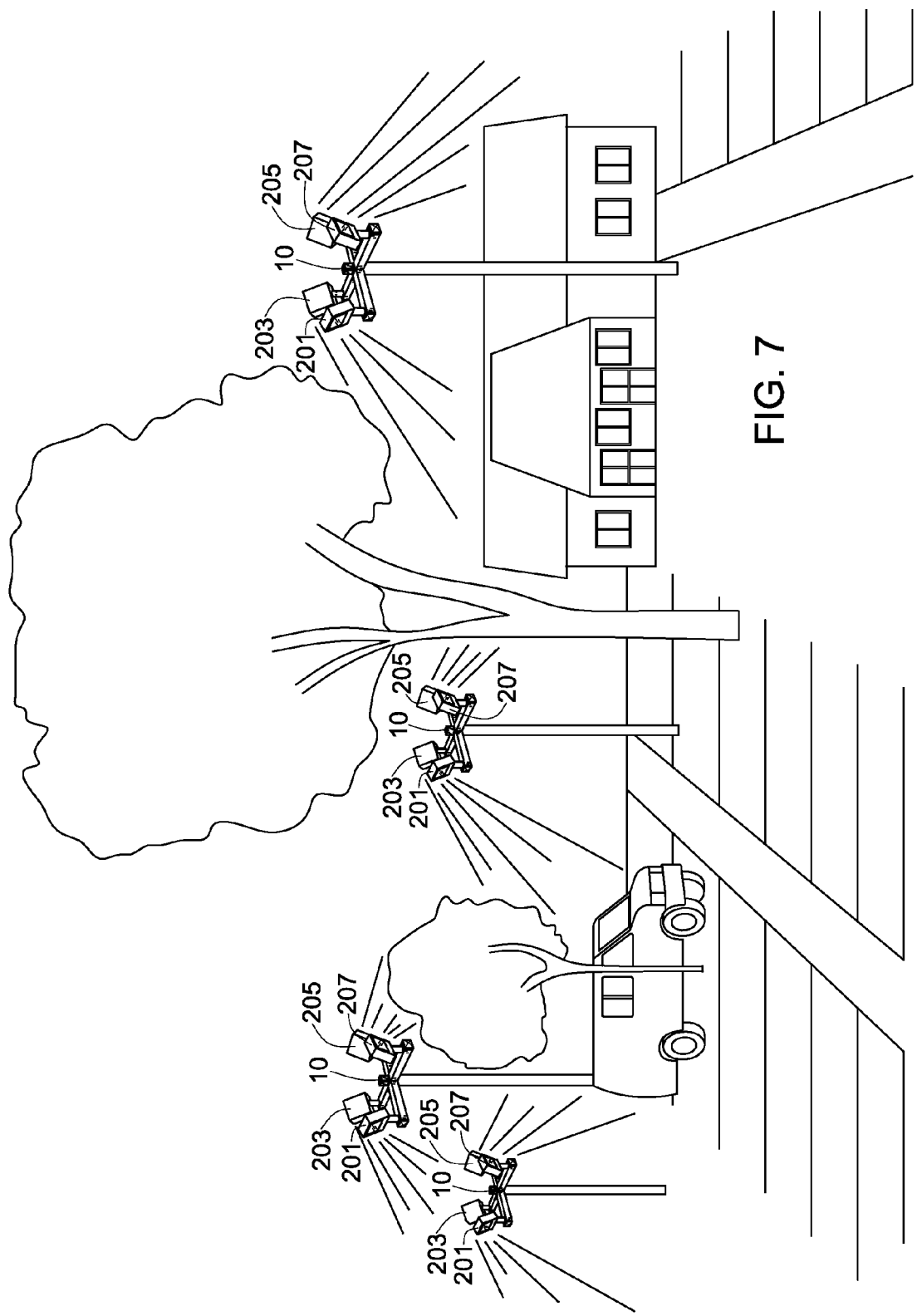
FIG. 7 is a perspective view of a parking lot and a plurality of lighting poles retrofitted with one or more time-delayed power switching devices in a first state according to an embodiment.

FIG. 7 is a perspective view of a parking lot and a plurality of lighting poles retrofitted with one or more time-delayed power switching devices 10. Each of the one or more time-delayed power switching devices 10 is shown operating in a first state, whereby all light outputs 201, 203, 205, and 207 are emitting light (as shown by the emitted light lines on the figure). With the power source providing power to one or more lighting poles, and the one or more time-delayed power switching devices 10 and the one or more light outputs connected thereto, the retrofitted area is provided with full lighting and from the time a power source is applied until the preset time period. Given, the location (e.g., latitude and typical daylight patterns) and nature of use (e.g. early or late evening customer activity for commercial establishments) of the retrofitted lighted area, the preset time period of the one or more time-delayed power switching devices 10 can be varied. Moreover, the one or more time-delayed power switching devices 10 with different preset time periods can have in different preset time period in the same retrofitted lighted area. For instance, several of the one or more time-delayed power switching devices 10 having a ten hour preset time period can be installed in lighting poles close to a frequently used walkway exiting a building and several of the one or more time-delayed power switching devices 10 having a six hour preset time period can be installed in lighting poles in less often used parking areas farther from the building.

Figure 8:
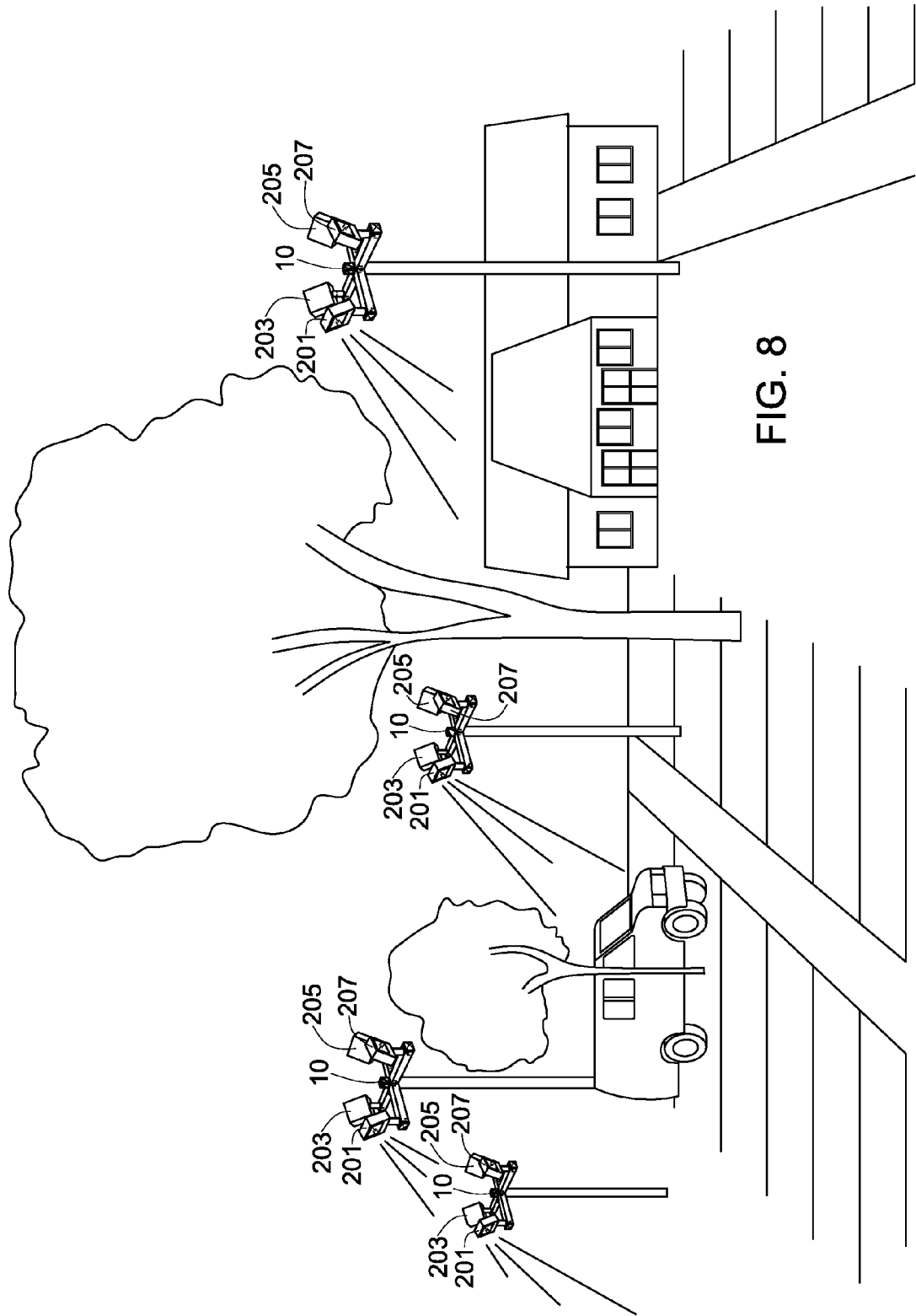
FIG. 8 is a perspective view of a parking lot and a plurality of lighting poles retrofitted with one or more time-delayed power switching devices in a second state according to an embodiment.

FIG. 8 is a perspective view of the parking lot and the plurality of lighting poles retrofitted with one or more time-delayed power switching devices 10 operating in the second state according to an embodiment. Therefore, significant power savings are achieved when one or more light outputs electrically coupled to the timed off conductive pathways are de-energized, while sufficient lighting is provided by the one or more light outputs electrically coupled to the one or more power pass-through conductive pathways to ensure a safely lit area at all times throughout the entire evening and overnight. It is pertinent to note that the one or more time-delayed power switching devices 10 can be changed from the second state of operation to the first state at any time. Briefly referring back to FIG. 3, the timer can be reset and thereby providing light from all light outputs until the timer with the preset time period expires. For example, it may be desirable to provide additionally lighting in lieu of energy cost savings on a given night when, significant repairs are being performed by a number of workers overnight. In such a situation, power from the power source may be shut off or powered down and then turned back on thereby causing the timer or timers of the one or more time-delayed power switching devices 10 to reset and revert back to operating in the first state.

Alternate Embodiments and Variations

The embodiments and variations thereof, illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure.

Alternate embodiments of the inventive concept may be used to energize or de-energize one or more light outputs in a variety of situations. For example, embodiments of the time-delayed power switching device can comprise a second timing circuit and relay with distinct timed off conductive pathways existing in a single time-delayed power switching device. This is typically desirable when a larger number of light outputs exist on a tenon assembly and it is beneficial to have light outputs be turned off at different times. In other alternate embodiments, the preset time delay in the timing logic of the time-delayed power switching device may be changed by receiving an encoded signal, such as a wireless signal from a transmitter, that indicates the value of the preset delay (e.g., 1 hour, 2 hours, 3 hours, 4 hours, 5 hours, 6 hours, 7 hour, 8 hours, etc.) to be utilized in the timing logic. All alternate embodiments and variations of the invention that read upon the appended claims are intended and contemplated to be within the scope of the invention.

I claim:

1. A time-delayed power switching device comprising:
a power source input;
a first conductive pathway;
a second conductive pathway;
a timing circuit;
one relay;
a circuit board;
one housing occupying a volume of about 12 inches; and
potting material including an epoxy resin; wherein:
the power source input is electrically coupled to the first conductive pathway and the one relay;
the one relay is electrically coupled to the timing circuit and the second conductive pathway, the one relay (i) having a first position adapted to energize the second conductive pathway when receiving a first signal from the timing circuit, (ii) having a second position adapted to de-energize second conductive pathway when receiving a second signal from the timing circuit, and (iii) being configured to conduct at least 4800 watts of power;

the timing circuit, the one relay, and the circuit board are substantially contained within the one housing; and timing circuit, the one relay, a first end of the power source input, a first end of the first conductive pathway, and a first end of the second conductive pathway are mounted on the circuit board.

2. A combination comprising:

a power source;

one or more light outputs;

a time-delayed power switching device, the time-delayed power switching device including:

a power source input;

one or more first conductive pathways;

one or more second conductive pathways;

at least one timing circuit;

a circuit board;

one relay configured to conduct at least 4800 watts of power to the one or more second conductive pathways when the one relay is in a first position;

one housing, the one relay, the circuit board, and the at least one timing circuit residing within the one housing, and the one housing occupying a volume of about 12 cubic inches;

a tenon assembly, the tenon assembly being mechanically coupled to the one or more light outputs and the time-delayed power switching device; wherein:

the power source is electrically coupled to the power source input;

the power source input is electrically coupled to the one relay;

the one relay is electrically coupled to the at least one timing circuit and the one or more second conductive pathways; and at least one of the one or more second conductive pathways is electrically coupled to at least one of the one or more light outputs, and the one relay has (1) the first position adapted to energize the one or more second conductive pathways when receiving a first signal from the at least one timing circuit, and (2) a second position adapted to de-energize the one or more second conductive pathways when receiving a second signal from the at least one timing circuit.

\* \* \* \* \*